United States Patent
Keskikangas et al.

(10) Patent No.: US 10,783,646 B2
(45) Date of Patent: Sep. 22, 2020

(54) METHOD FOR DETECTING MOTION IN A VIDEO SEQUENCE

(71) Applicant: Axis AB, Lund (SE)

(72) Inventors: Axel Keskikangas, Lund (SE); Song Yuan, Lund (SE)

(73) Assignee: Axis AB, Lund (SE)

(*) Notice: Subject to any disclaimer, the term of this patent is extended or adjusted under 35 U.S.C. 154(b) by 7 days.

(21) Appl. No.: 16/351,042

(22) Filed: Mar. 12, 2019

(65) Prior Publication Data
US 2019/0340771 A1  Nov. 7, 2019

(30) Foreign Application Priority Data
May 4, 2018  (EP) ..................................... 18170829

(51) Int. Cl.
*G06T 7/246*  (2017.01)
*G06T 3/40*  (2006.01)
(Continued)

(52) U.S. Cl.
CPC ............ *G06T 7/248* (2017.01); *G06T 3/4038* (2013.01); *G06T 5/006* (2013.01); *G06T 5/50* (2013.01); *G06T 2207/10016* (2013.01)

(58) Field of Classification Search
CPC ........... G06T 7/248; G06T 7/001; G06T 7/32; G06T 3/4038; G06T 5/006; G06T 5/50; G06T 2207/10016; G06T 2207/20021; G06T 2207/20201; G06T 2207/20212; G06T 2207/20228; H04N 5/23267; H04N 5/3572; H04N 5/23254; H04N 5/23258;
(Continued)

(56) References Cited

U.S. PATENT DOCUMENTS 8,446,477 B2 * 5/2013 Irisawa .............. H04N 5/23248
  348/208.11
8,711,337 B2  4/2014 Rohrseitz
(Continued)

FOREIGN PATENT DOCUMENTS

| EP | 3051796 A1 | 8/2016 |
| WO | 2011002775 A1 | 1/2011 |
| WO | 201660794 A1 | 10/2016 |

OTHER PUBLICATIONS

"Oncam Evolution 12 Camera Range: Installation & User Manual," Oncam Global Group AG, Nov. 2016, 60 pages.
(Continued)

*Primary Examiner* — Michael S Osinski
(74) *Attorney, Agent, or Firm* — Snyder, Clark, Lesch & Chung, LLP (57) ABSTRACT

A method for detecting motion in a video sequence comprising distorted image frames is provided. The method comprises determining (101) a spatial resolution distribution for the distorted image frames; determining (102) a motion detection sensitivity map for the distorted image frames, the motion detection sensitivity map comprising areas having different motion detection sensitivity levels, wherein the motion detection sensitivity map is determined based on the spatial resolution distribution; and detecting (103) motion in the video sequence based on the motion detection sensitivity map. A motion detecting component and a camera including such a component is also disclosed.

20 Claims, 4 Drawing Sheets

(51) Int. Cl.
*G06T 5/00* (2006.01)
*G06T 5/50* (2006.01)

(58) Field of Classification Search
CPC .......... H04N 5/23229; H04N 5/23251; H04N 5/23264
See application file for complete search history.

(56) References Cited

U.S. PATENT DOCUMENTS

| | | | |
|---|---|---|---|
| 9,215,358 B2* | 12/2015 | Sablak | G08B 13/19604 |
| 10,366,509 B2* | 7/2019 | Jones | G06T 7/194 |
| 2007/0252693 A1 | 11/2007 | Janson | |
| 2009/0040396 A1* | 2/2009 | Aso | H04N 9/3185 348/744 |
| 2010/0002070 A1* | 1/2010 | Ahiska | H04N 5/23206 348/36 |
| 2010/0002071 A1* | 1/2010 | Ahiska | H04N 5/217 348/36 |
| 2010/0295956 A1* | 11/2010 | Goto | H04N 5/23248 348/208.6 |
| 2012/0019614 A1 | 1/2012 | Murray et al. | |
| 2012/0249726 A1 | 10/2012 | Corcoran et al. | |
| 2014/0126827 A1* | 5/2014 | Chen | G06K 9/4604 382/195 |
| 2015/0022678 A1* | 1/2015 | Tsubaki | H04N 5/23287 348/208.5 |
| 2015/0070519 A1* | 3/2015 | Motoki | H04N 5/23267 348/208.6 |
| 2015/0085149 A1* | 3/2015 | Tsubaki | H04N 5/2628 348/208.4 |
| 2016/0225160 A1* | 8/2016 | Shimada | H04N 5/232 |
| 2016/0323504 A1* | 11/2016 | Ono | H04N 5/2259 |
| 2016/0353039 A1* | 12/2016 | Rephaeli | H01L 27/14627 |
| 2017/0104898 A1* | 4/2017 | Ohki | H04N 5/217 |
| 2017/0126972 A1 | 5/2017 | Evans et al. | |
| 2017/0307360 A1* | 10/2017 | Imai | G06T 7/246 |
| 2018/0106609 A1* | 4/2018 | Imai | G01B 11/16 |
| 2018/0213153 A1* | 7/2018 | Iso | H04N 5/23229 |
| 2019/0384033 A1* | 12/2019 | Shirai | G02B 7/04 |
| 2019/0384964 A1* | 12/2019 | Ando | G01B 11/24 |

OTHER PUBLICATIONS

Extended European Search Report issued in corresponding EP Application No. 18170829.8 dated Nov. 8, 2018, 5 pages.

* cited by examiner

METHOD FOR DETECTING MOTION IN A VIDEO SEQUENCE

CROSS-REFERENCE TO RELATED APPLICATIONS

This application claims priority to European Patent Application No. 18170829.8, filed May 4, 2018, which is incorporated herein by reference.

TECHNICAL FIELD

The present invention relates to the field of detecting motion in a video sequence.

BACKGROUND

A large field for camera applications is surveillance. Motion detection is important feature in camera surveillance systems, and it is therefore beneficial to have an efficient motion detection algorithm. A drawback for motion detection algorithms in general is that they are designed with rectilinear lenses in mind, i.e. for lenses for which straight lines in reality remain straight in a captured image thereof. The motion detection algorithms are therefore not optimal to perform on video sequences comprising distorted image frames. The result for a conventional motion analysis of distorted image frames can become poor or the analysis could require more processing of the video sequence. For example, a video sequence captured by a wide-angle-lens includes, by nature of the lens, distorted image frames. Such a video sequence typically requires a dewarping process to be executed before being able to, with good results, perform motion detection.

There exist different distortion sources which can cause distorted image frames, for example wide-angle lenses, such as fish-eye lenses, optical domes, and stitching techniques for providing a panorama image. In stitching, a plurality of primary images captured using one or more image sensors are combined to form a single image. There are several known stitching algorithms to choose from.

Distortions can also be caused by imperfections during manufacturing of rectilinear lenses.

There are different types of distortion shapes depending on the distortion source. One example is radial distortions, including barrel distortion, pincushion distortion, and mustache distortion, which arise from the symmetry of a lens. Distortions can alternatively have an irregular shape.

Regardless of distortion source(s) and shape of distortion, the distortion is a challenge when analysing the image. For example, many motion detection algorithms suffer heavily when applied to distorted images since most algorithms are designed to be applied to non-distorted images. Thus, it becomes computationally heavy for a processor to apply motion detection algorithms, or other similar algorithms, on a distorted image.

As mentioned, a solution to this problem is to perform dewarping on a distorted image before applying motion detection. Dewarping is a process to reverse a distorted image into a linearly projected image, for which the motion detection algorithm works better. However, dewarping is by itself a very computationally heavy operation which burdens the processor and, also, takes up valuable resources (time, power, bandwidth) in for example a processor and a scaler unit. Moreover, dewarping burdens the scaler unit in the camera system which is a limited resource and thus other processes also needing access to the scaler may suffer.

Thus, there is a need for improved methods addressing the above discussed problems.

SUMMARY OF THE INVENTION

A general object of the present invention is to provide a motion detection method which is improved in view of application on distorted images. A specific object of the present invention is to address the problem of applying conventional motion detection algorithms on images produced by a camera system having physical sources of distortion, such as wide-angle lenses or optical domes, or digital sources of distortion, such as stitching processes.

According to a first aspect, these and other objects are achieved, in full or at least in part, by a method for detecting motion in a video sequence comprising distorted image frames produced via at least one image sensor. The method comprises:

determining a spatial resolution distribution for the distorted image frames;

determining a motion detection sensitivity map for the distorted image frames, the motion detection sensitivity map comprising areas having different motion detection sensitivity levels, wherein the motion detection sensitivity map is determined based on the spatial resolution distribution; and detecting motion in the video sequence based on the motion detection sensitivity map.

The at least one image sensor may be comprised in a camera.

As used herein "distorted image" or "distorted image frame" means an image which has a distorted perspective. In a distorted image, straight lines in the scene are typically curved to some degree. In contrast, a perfectly rectilinear image has perfectly straight lines corresponding to straight lines in the scene. Within the context of this application, two types of distortion sources are discussed: physical distortion sources and digital distortion sources. Non-limiting examples of physical distortion sources are wide-angle lenses, including fish-eye lenses (e.g. f-theta lenses), optical domes and imperfectly rectilinear lenses. Imperfections in a lens may be caused by manufacturing imprecisions. Non-limiting examples of digital distortion sources are image stitching algorithms. The distortion pattern can be irregular or regular (such as radial distortions). The distortion pattern of a captured image may be the result from one or a combination of distortion sources.

As used herein "spatial resolution distribution" means a map of spatial resolution for an image frame. In a distorted image, acquired through e.g. a wide-angle lens or stitched from multiple image frames, different areas of the image have different spatial resolution. In other words, equally sized areas of the image frame cover differently sized angles of the camera's field of view (FOV). The spatial resolution may be specified on a pixel level for an image frame, or can be determined on a pixel sub-group level, e.g. on a macroblock level. Spatial resolution may be expressed as number of pixels per FOV angle, or as amount of FOV angle per pixel. The skilled person is familiar with how to interchange between these expressions depending on application. For example, in an implementation of a method according to the present application, one of these expressions may be preferred to use. A spatial resolution distribution may be represented by e.g. a table indicating the spatial resolution distribution for pixels or pixel sub-groups, e.g. for macroblocks.

As used herein "motion detection sensitivity level" means a level indicating the amount of sensitivity that is to be used in a motion detection algorithm applied to a video sequence. Different scales may be applied. For example, a scale of 1-100 may be applied where 1 indicates the lowest sensitivity (meaning that a large difference between consecutive image frames is required for motion to be detected) and where 100 indicates the highest sensitivity (meaning that even a small difference between consecutive image frames will result in detected motion).

As used herein "motion detection sensitivity map" indicates the distribution of motion detection sensitivity levels in an image frame. A motion detection sensitivity map may be determined and used for a plurality of image frames, e.g. a sequence of image frames. The motion detection sensitivity map may be represented by e.g. a table which maps a motion detection sensitivity level to each pixel or pixel group (e.g. for each macroblock) in an image frame, or as a function. The function may for example have a distance to a predetermined location or predetermined area in the image frame as an input and the motion detection sensitivity level as an output.

As used herein "lens polynomial" means a lens-specific polynomial that represents the lens refraction for a lens or for an optical dome. The lens polynomial may be acquired by performing measurements, e.g. using an off-axis modular transfer function (MTF) measurement method, on the lens or on the optical dome. A lens or optical dome manufacturer can typically provide the lens polynomial, or a table representing the distortion, for different types of lenses or optical domes in their assortment.

As used herein "projection algorithm" means an algorithm that describes how multiple primary image frames are stitched/combined to form a stitched image frame. The projection algorithm may be designed with different purposes, e.g. for providing a smooth transition between the primary image frames or for minimizing distortions in the resulting image frame. The projection algorithm may vary between different stitching algorithms. Typically, the same projection algorithm is used for a captured video sequence.

The invention relies on the insight of the inventors that it is beneficial to set a motion detection sensitivity level for an image frame area to correspond to a spatial resolution of that image frame area. The spatial resolution represents how much of the FOV that is covered by the image frame area. If a larger angle of the FOV is covered, then the motion sensitivity level should be set higher since a movement in the covered FOV angle will be translated to a relatively smaller movement in the image frame area. Accordingly, if a smaller angle of FOV is covered by the same sized image frame area, then the motion sensitivity level should be set lower since a movement in the covered FOV angle will be translated to a relatively higher movement in the image frame area. This insight is particularly useful for distorted image frames. This application discusses distorted image frames where the distortion is caused by a physical distortion source and/or a digital distortion source.

Based on the insight by the inventors, a motion detection sensitivity map is determined based on the spatial resolution distribution. As defined above, the motion detection sensitivity map provides information on which motion detection sensitivity to use during motion detection for different areas, or even pixels, of an image frame in a video sequence. Depending on the imaging system used, the motion detection sensitivity map is differently determined, however it is within the knowledge of the skilled person how to determine the sensitivity map given the parameters of the imaging system.

The motion detection sensitivity map is then used in a motion detection algorithm, performed by e.g. a processor, for detecting motion in the video sequence comprising the distorted image frames. Using such a motion detection sensitivity map, the motion detection may become more efficient for video sequences comprising distorted image frames.

It may be sufficient to determine a motion detection sensitivity map once for a video sequence, since the parameters on which the determination is based typically remain the same during the capturing of the video sequence.

In one embodiment, the distorted image frames may be produced by capturing by one image sensor through a wide-angle lens comprised in the camera. The spatial resolution distribution may in this embodiment be determined based on a lens polynomial of the wide-angle lens. The lens polynomial may be measured or be acquired by the lens manufacturer.

The wide-angle lens may be a fish-eye lens, which is a type of ultra wide-angle lens.

In one embodiment, the distorted image frames are produced by capturing by one image sensor through an optical dome comprised in the camera. The spatial resolution distribution may in this embodiment be determined based on a lens polynomial of the optical dome. The lens polynomial of the optical dome may be measured or be acquired by a manufacturer of the optical dome.

The areas of the motion detection sensitivity map may in this embodiment form an elliptical pattern which radially extends from a reference position of the motion detection sensitivity map. The elliptical pattern may form a circular pattern. In that case, each area may be located at a radial distance from a reference position of the motion detection sensitivity map.

The motion detection sensitivity level of each area may be set to increase with the distance from the respective area to the reference position. The reference position may for example be a central position in the map.

In another embodiment, each distored image frame is produced by a stitching, based on a projection algorithm, of a plurality of primary images captured by one or more image sensors. The plurality of primary images may be captured by a plurality of image sensors which may be located on the same or on different cameras.

The spatial resolution distribution may in this embodiment be determined based on the projection algorithm. The projection algorithm is defined in the stitching algorithm.

Motion detection may be used in other algorithms of a camera system. For example, motion detection may be used as input to object detection, object tracking, ground plane detection or determining alarm events. One embodiment of the invention includes performing an imaging processing algorithm, such as object detection, object tracking, ground plane detection or determining alarm events, based on the determined motion detection.

According to a second aspect, the above disclosed and other objects are achieved, in full or at least in part, by a computer program product comprising a computer-readable medium having computer code instructions stored thereon adapted to carry out the method according to any one of the embodiment according to the first aspect when executed by a device having processing capability.

According to a third aspect, the above disclosed and other objects are achieved, in full or at least in part, by a motion detecting component for detecting motion in a video sequence comprising distorted image frames produced via at least one image sensor in a camera. The motion detecting component comprises:

a spatial resolution distribution component adapted to determined a spatial resolution distribution for the distorted image frames;

a motion detection sensitivity map component adapted to determine a motion detection sensitivity map for the distorted image frame, the motion detection sensitivity map comprising areas having different motion detection sensitivity levels, wherein the motion detection sensitivity map is determined based on the spatial resolution distribution; and a motion detecting component adapted to detect motion in the video sequence based on the motion detection sensitivity map.

The motion detecting component of the third aspect may generally be embodied in the same ways as the method of the first aspect with accompanying advantages.

According to a fourth aspect, the above disclosed and other objects are achieved, in full or at least in part, by a camera comprising the motion detecting component according to the third aspect, or any of its embodiments.

In one embodiment, the camera may comprise a wide-angle lens through which images are captured by one image sensor of the camera.

In another embodiment, the camera may comprise a plurality of image sensors and further comprising a stitching component adapted to stitch image frames from a plurality of primary images captured by the plurality of image sensors.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
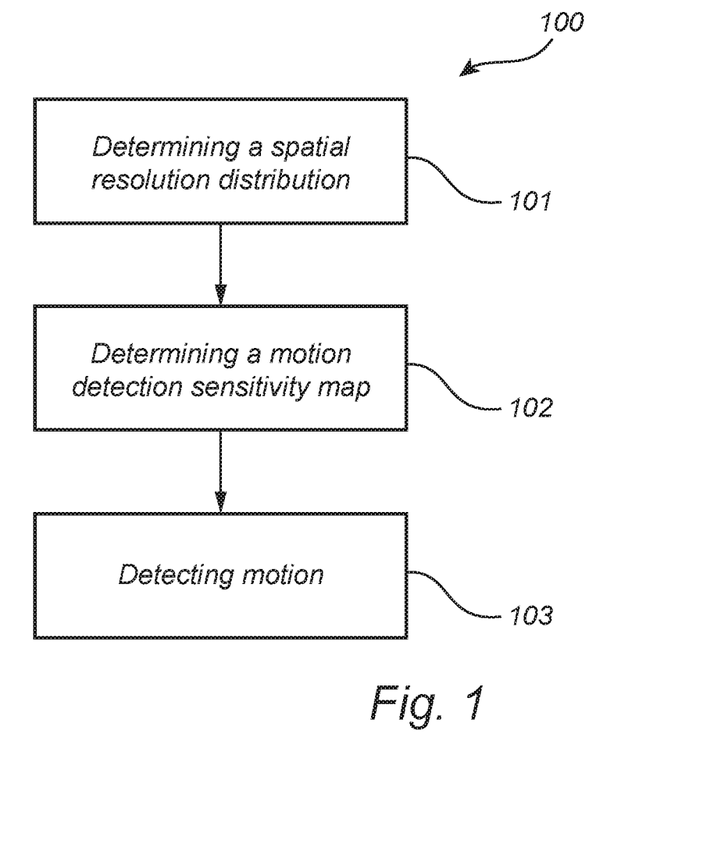
FIG. 1 illustrates a method for detecting motion according to an embodiment.

In FIG. 1, a method 100 for detecting motion in a video sequence according to an embodiment of the invention is illustrated. The method 100 is performed on a video sequence which includes distorted image frames. The method 100 may be performed, e.g., in a processor of a camera system or in a processor of a device separate from a camera system. Different parts of the method may be performed in different processing devices. Some parts of the method may be performed by the camera system and other parts may be performed by another one or more processing devices.

The video sequence may have been altered or otherwise processed before being subjected to the present method 100 for detecting motion. The camera system used for capturing the video sequence may be a monitoring camera system adapted for outdoor and/or indoor surveillance.

The method 100 comprises a first step 101 of determining a spatial resolution distribution for one or more of the image frames in the video sequence. As defined above, the spatial resolution distribution is a representation of the spatial resolution for one or more image frames. The spatial resolution may be determined once (e.g. before capturing of video sequences) for a camera system, and may be applied to video sequences captured by that camera system as long as the base for the determination does not change. In this application, two variants of how to determine the spatial resolution distribution will be discussed: a first where the spatial resolution distribution is determined based on a lens polynomial, and a second where the spatial resolution distribution is determined based on a projection algorithm. The scope of this application is however not limited to these variants. Other variants for determining the spatial resolution distribution may be within reach for the skilled person.

In a second step 102, a motion detection sensitivity map is determined for the distorted image frames of the video sequence. The motion detection sensitivity map represents the distribution of motion detection sensitivity levels for an image frame. The purpose of the motion detection sensitivity map is to function as an input to a motion detection algorithm regarding which motion detection sensitivity to use for which area in the image frames. The motion detection sensitivity map may be represented as, e.g., a table or function as will be exemplified in detail later. The motion detection sensitivity map is determined based on the spatial resolution distribution.

In a third step 103, motion is detected in the video sequence, comprising the distorted image frames, based on the determined motion detection sensitivity map.

An important aspect of the invention is that the motion detection sensitivity map, on which the motion detection is based, is determined based on the spatial resolution distribution. By this feature, the motion detection may become more adapted to the distorted characteristics of the image frames. As will be evident from the more detailed examples of embodiments below, this is highly beneficial for the analysis of video sequences captured with a camera system having a wide-angle lens, optical dome or a multi-sensor camera system which produces stitched images. The inventors have realized that by making a connection between the spatial resolution distribution, defined by the camera system, and the motion detection sensitivity levels of the captured image frames, the above-mentioned advantages may be achieved. That is, a motion detection free from impact by distorted characteristics may, in part or in full, be achieved. Moreover, the method does not require a user-input, which is the case with some known methods for setting motion detection sensitivity levels.

Going more into detail, two different embodiments will now be disclosed with reference to FIGS. 2-3 and FIG. 4-5, respectively.

Figure 2:
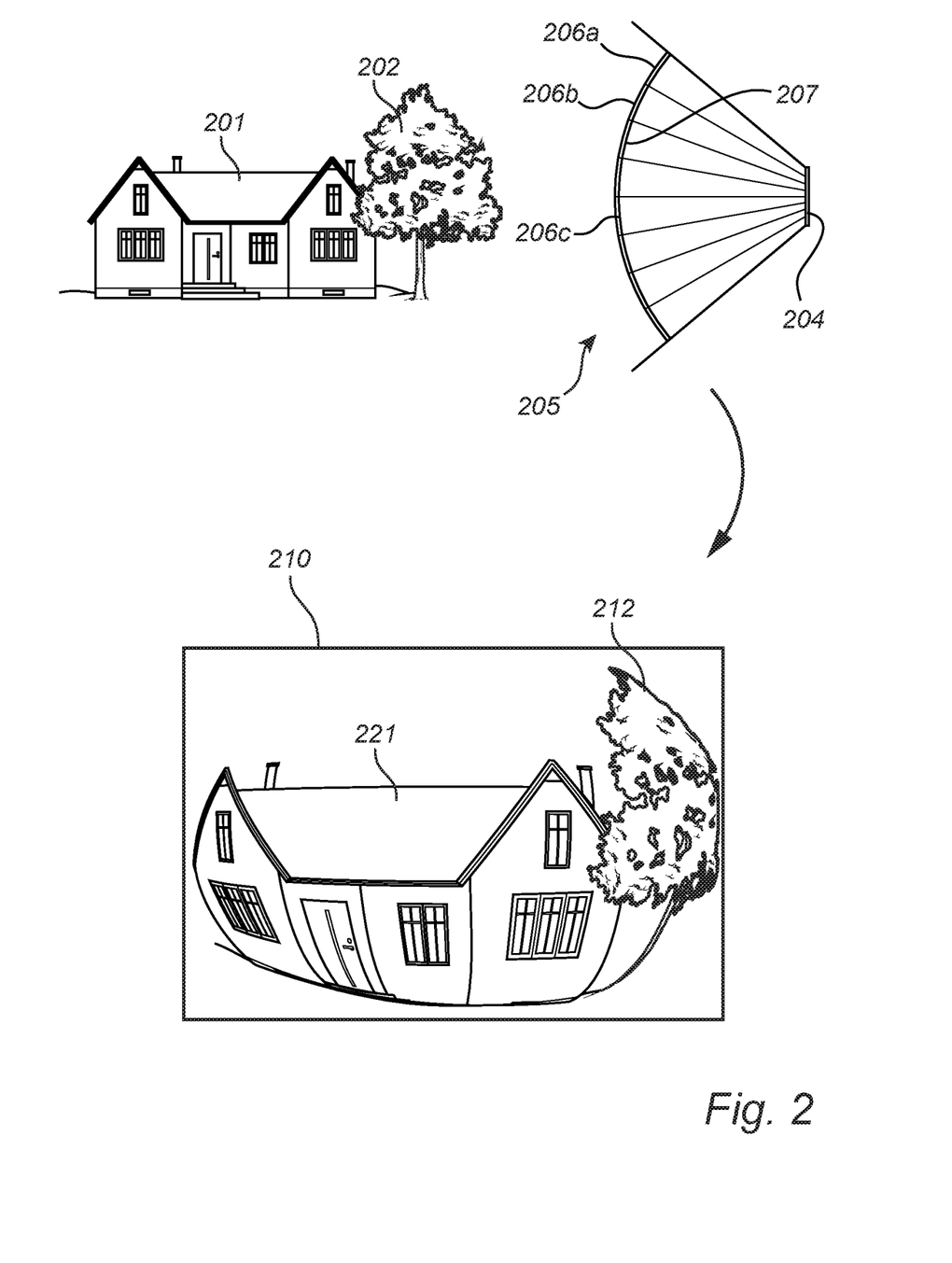
FIG. 2 illustrates a scene that is captured in an image frame by an image sensor.

Starting with the first embodiment, a camera system including an image sensor 204 and a wide-angle lens 207 is illustrated in FIG. 2. The wide-angle lens 207 may be a fish-eye lens. The camera system captures image frames of a scene including objects being a house 201 and a tree 202. The area of the scene that is viewed by the camera system is defined as the field of view (FOV) 205. The FOV is divided into equiangular viewing areas represented by 206a, 206b, 206c. This division is illustrated to aid the disclosure of the present embodiment, and is not necessarily a part of the implementation of the method or camera system. In other words, it is not intended to physically divide the FOV into different viewing areas in a realization of the disclosed camera system.

A video sequence is captured by the image sensor 204 of the camera system. A representative image frame 210 of the video sequence is illustrated in FIG. 2. The image frame 210 includes a first imaged object 221 corresponding to the house 201 and a second imaged object 212 corresponding to the tree 202. The image frame 210 is distorted since it is captured by use of the wide-angle lens 207. The distortion may be described as providing a convex appearance of the scene. Wide-angle lenses may have different mapping functions which provides for distortions of different appearances. Nonlimiting examples of mapping function types are stereographic, equidistant, equisolid angle, and orthographic. Ultimately, it is the lens polynomial for the lens 207 used which defines the distortion.

For the camera system using the lens 207, a spatial resolution distribution is determined based on the lens polynomial for the lens 207. A non-limiting example of a lens polynomial is:

Angle=$T\_1+T\_2*x+T\_3*x^2+T\_4*x^3+T\_5*x^4$ wherein the angle is the angle between the sensor-to-lens-axis and the inward facing lens surface, x is defined as distance in millimeters to the center of the lens, and the T parameters are given the following values:

$T\_1=0$
$T\_2=-35$
$T\_3=-0.03$
$T\_4=-0.408$
$T\_5=0.010$

Based on the lens polynomial, a spatial resolution distribution determined expressed as number of pixels per FOV angle 206a, 206b, 206c. In other words, the spatial resolution distribution tells how many pixels that are covered by one of the equiangular viewing areas 206a, 206b, 206c for different pixel areas in the image frame 210. As can be seen, in a centre area of the image frame 210, a larger number of pixels covers an equiangular viewing area when compared to a peripheral area of the image frame 210.

The spatial resolution can be expressed, for example, as a table providing the spatial resolution for pixels or for group of pixels, for example for macroblocks. The spatial resolution may be determined for groups of pixels, wherein the groups of pixels are of different size depending on which area of the image frame they are located. For a wide-angle lens, such as a fish-eye, the spatial resolution may be defined in a central area for larger macroblocks, e.g. of the size 16×16, and be defined in peripheral areas, having a larger distortion than the central area, for smaller macroblocks, e.g. of the size 4×4. Thus, a more efficient way of representing the spatial resolution distribution is achieved. For other lenses, the same principle may be applied. That is, the spatial resolution may be defined for larger pixel groups for image areas having low distortion, and be defined for smaller pixel groups for image areas having high distortion. Through the lens polynomial, the level of distortion in different parts of the image may be determined.

Figure 3:
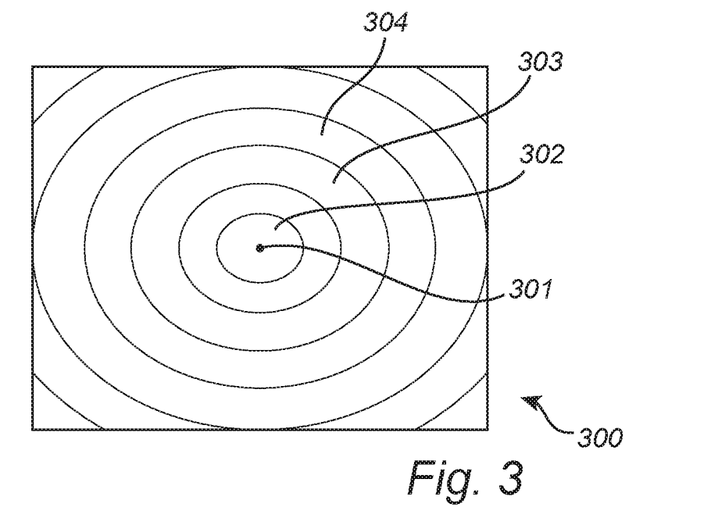
FIG. 3 illustrates a motion detection sensitivity map according to an embodiment.

Based on the determined spatial resolution distribution, a motion detection sensitivity map 300 is determined, which is illustrated in FIG. 3. The motion detection sensitivity map 300 has the same dimensions as the image frame 210 (and other image frames of the video sequence). The motion detection sensitivity map 300 comprises areas 302, 303, 304 representing different motion detection sensitivity levels. The motion detection sensitivity map 300 may be created by forming different areas for different spatial resolutions or spatial resolution intervals. The areas 302, 303, 304 in the motion detection sensitivity map 300 are associated with different motion detection sensitivity levels depending on the spatial resolution or spatial resolution interval they represent.

In this embodiment, the areas 302, 303, 304 of the motion detection sensitivity map 300 forms an elliptical pattern which extends in a radial direction from a reference position 301. The elliptical pattern originates from the spatial resolution distribution which varies with the distance to a central location of the image frame 210. Expressed in pixels per FOV angle, the spatial resolution distribution decreases with the distance to a central location of the image frame 210. In other words, in the peripheral areas of the image frame 210, a smaller number of pixels covers the same FOV angle when compared to central areas of the image frame 210. The motion detection sensitivity map 300 reflects this relation in that the motion detection sensitivity levels of the areas 302, 303, 304 increases with a radial distance from each area to the reference position 301. The motion detection sensitivity level may be expressed as a numerical value on a scale, for example 1-100.

Based on the motion detection sensitivity map 300, a motion detection algorithm is applied to the video sequence including the image frame 210. The motion detection algorithm can be chosen among conventional motion detection algorithms. The motion detection sensitivity level is set for different areas of the image frame 210 in accordance with the motion detection sensitivity map 300. In other words, motion is detected with lower sensitivity in a central area 302 relative to motion detected in a more peripheral area 304. How to implement a motion detection with different motion sensitivity levels for different areas, once the motion detection sensitivity map has been determined, is known and within reach for the skilled person, without any further explanation herein. By basing the motion detection on a motion detection sensitivity map, a motion detection can be applied regardless of distortion in the image frames of the video sequence and having the same satisfying result as motion detection applied to image frames with a rectilinear perspective.

The motion detection sensitivity map 300 may be represented by for example a table or a function.

A table could for example associate pixels or pixel sub-groups, such as macroblocks of different sizes, with a motion detection sensitivity level:

| Pixel | Motion detection sensitivity level |
|---|---|
| (0, 0) | 10 |
| (0, 1) | 11 |
| (0, 2) | 11 |
| ... | ... |

A function could for example provide the motion detection sensitivity level as an output as a function of the distance to the reference position 301:

$$MDSL = f(d_{ref})$$

where MDSL is motion detection sensitivity level and $d_{ref}$ is distance to the reference position 301.

The first embodiment is here illustrated in a two-dimensional manner to facilitate understanding of the underlying inventive principle. It is however possible for the skilled person to convert this manner into a real-world implementation which requires a three-dimensional approach.

The inventive method as applied to a camera system comprising a wide-angle lens can be applicable also to camera systems comprising other types of physical distortion sources. One example of such a camera system is an optical dome camera comprising an optical dome through which the camera depicts a scene. That is, light, or other radiation for capturing images, are transported through a transparent, or semitransparent, optical dome before going through the optics, comprising a lens, and perceived by the image sensor. The optical dome has a dome shape which can be described with a lens polynomial which can be used for determining a spatial resolution distribution for captured image frames in the same manner as described above for the wide-angle lens camera system.

Figure 4:
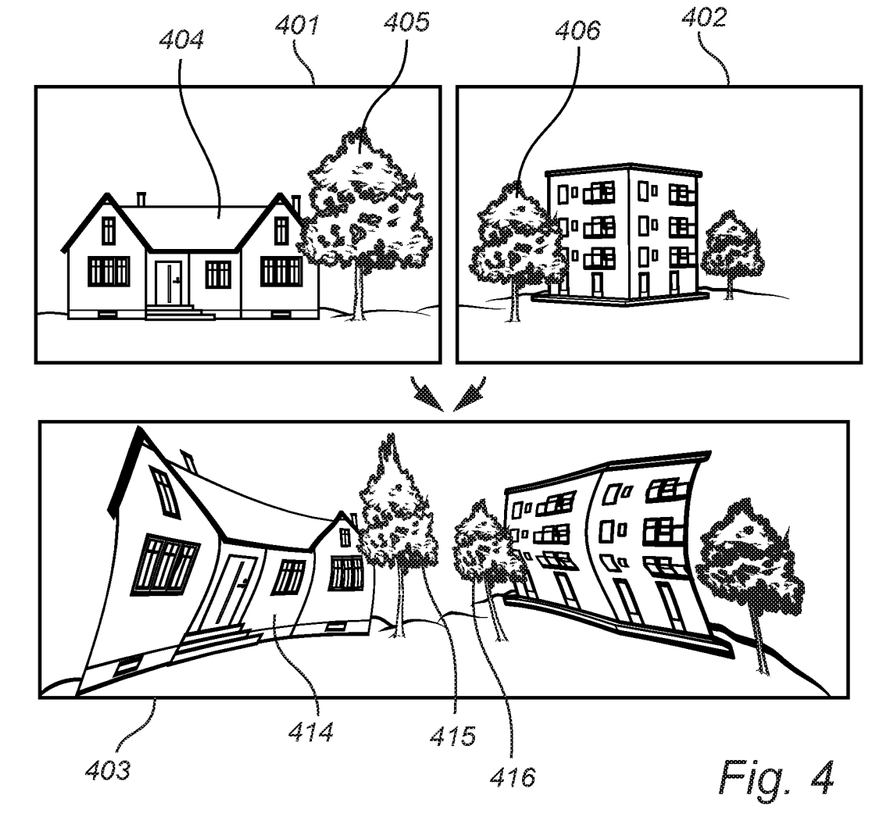
FIG. 4 illustrates a set of primary images that are stitched into a common distorted image frame.

Continuing to the second embodiment, a set of primary images 401, 402 is illustrated in FIG. 4. Each primary image 401, 402 is captured by an image sensor of a camera in a camera system. The primary images 401, 402 may be captured through a rectilinear lens. The primary images 401, 402 may be captured by different image sensors in multiple sensor camera system, or by a single image sensor adapted to pan a scene. The primary images 401 depicts objects such as a house 404, a first tree 405 and a second tree 406.

A distorted panoramic image frame 403 is produced by stitching of the primary images 401, 402 based on a projection algorithm. Conventional projection algorithms may be used, e.g. a cylindrical projection algorithm for the image frame 403.

A spatial resolution distribution is determined based on the projection algorithm. The principle for how to determine the spatial resolution distribution is the same as for the first embodiment. Based on the projection algorithm, the spatial resolution in different pixels, or pixel sub-groups, can be calculated.

Figure 5:
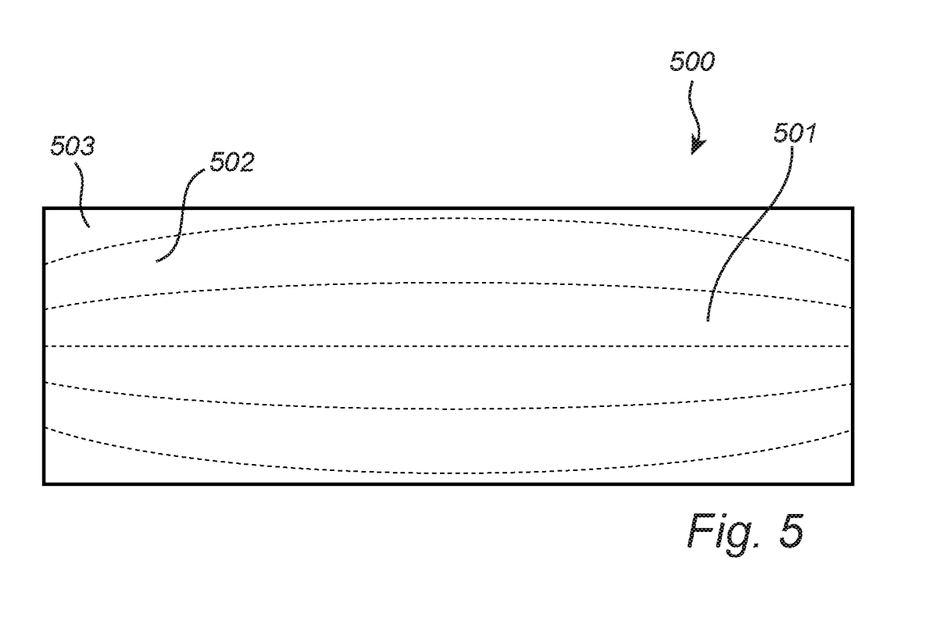
FIG. 5 illustrates a motion detection sensitivity map according to an embodiment.

A motion detection sensitivity map 500, illustrated in FIG. 5, is determined based on the spatial resolution distribution. The motion detection sensitivity map 500 can be described as translating the spatial resolution distribution into different areas having different motion detection sensitivity levels. In this exemplifying embodiment, the motion detection sensitivity map 500 comprises horizontally extending areas 501, 502, 503 which are curved away from a straight horizontal line. The horizontal line corresponds to the position of the horizon of the scene, and may thus be positioned differently depending on how the camera is positioned. Each area 501, 502, 503 represents a motion detection sensitivity level.

Based on the motion detection sensitivity map 500, a motion detection algorithm is applied to the video sequence including the image frame 403. The motion detection algorithm can be chosen among conventional motion detection algorithms. The motion detection sensitivity level is set for different areas of the image frame 403 in accordance with the motion detection sensitivity map 500. The motion detection sensitivity map 500 may be represented by for example a table or a function.

The same principle applies to this second embodiment as for the first embodiment, and therefore not disclosed in detail again. Reference is made to the disclosure of the first embodiment.

Even though the above examples disclose the method being applied to camera systems comprising only one distortion source, it is understood by a skilled person that the method may be applied to a camera system comprising more than one source of distortion. Non-limiting examples of combinations of distortion sources are: a wide-angle lens combined with an optical dome, a wide-angle lens combined with a stitching algorithm, or an optical dome combined with a stitching algorithm. Moreover, based on the description herein, the skilled person can apply the method on a camera system with combined distortion sources. In particular, the spatial resolution distribution in that case be determined based on the multiple sources of distortion, which can be done through conventional methods. A non-limiting example is that the spatial resolution distribution is determined based on a lens polynomial of a wide-angle lens and based on a lens polynomial of an optical dome.

As apparent by each of the above disclosed embodiments, the motion detection sensitivity map is dependent on the spatial resolution distribution. In other words, different spatial resolution distributions render different motion detection sensitivity maps. This applies to spatial resolution distributions regardless of how they are determined, e.g. if they are based on a lens polynomial or on a projection algorithm.

The person skilled in the art realizes that the present invention by no means is limited to the preferred embodiments described above. On the contrary, many modifications and variations are possible within the scope of the appended claims. For example, other types of lens polynomial or projections algorithms may be used. Also, the method is applicable also on video sequences comprising distorted image frames which distortion originates from other processes than the ones disclosed herein.

The invention claimed is:

1. A method for detecting motion in a video sequence comprising distorted image frames produced via at least one image sensor, the method comprising:
   determining a spatial resolution distribution for the distorted image frames;
   determining a motion detection sensitivity map for the distorted image frames, the motion detection sensitivity map comprising areas having different motion detection sensitivity levels, wherein the motion detection sensitivity map is determined based on the spatial resolution distribution; and
   detecting motion in the video sequence based on the motion detection sensitivity map.

2. The method according to claim 1, wherein the distorted image frames are produced by capturing by one image sensor through a wide-angle lens, and wherein the spatial resolution distribution is determined based on a lens polynomial of the wide-angle lens.

3. The method according to claim 2, wherein the wide-angle lens is a fish-eye lens.

4. The method according to claim 2, wherein the distorted image frames are produced by capturing by one image sensor through an optical dome, and wherein the spatial resolution distribution is determined based on a lens polynomial of the optical dome.

5. The method according to claim 2,
wherein the areas of the motion detection sensitivity map forms an elliptical pattern radially extending from a reference position of the motion detection sensitivity map, and
wherein the motion detection sensitivity level of each area increases with a radial distance from the area to the reference position.

6. The method according to claim 1, wherein each distorted image frame is produced by a stitching, based on a projection algorithm, of a plurality of primary images captured by one or more image sensors.

7. The method according to claim 6, wherein the spatial resolution distribution is determined based on the projection algorithm.

8. The method according to claim 1, further comprising:
performing object detection, object tracking, ground plane detection or determining alarm events based on the detected motion.

9. A computer program product comprising a non-transitory computer-readable medium having computer code instructions stored thereon adapted to carry out a method when executed by a device having processing capability, the method comprising:
determining a spatial resolution distribution for the distorted image frames;
determining a motion detection sensitivity map for the distorted image frames, the motion detection sensitivity map comprising areas having different motion detection sensitivity levels, wherein the motion detection sensitivity map is determined based on the spatial resolution distribution; and
detecting motion in the video sequence based on the motion detection sensitivity map.

10. A motion detecting component for detecting motion in a video sequence comprising distorted image frames produced via at least one image sensor, the motion detecting component comprising:
a spatial resolution distribution component adapted to determine a spatial resolution distribution for the distorted image frames; and
a motion detection sensitivity map component adapted to determine a motion detection sensitivity map for the distorted image frames, the motion detection sensitivity map comprising areas having different motion detection sensitivity levels, wherein the motion detection sensitivity map is determined based on the spatial resolution distribution;
wherein the motion detecting component is adapted to detect motion in the video sequence based on the motion detection sensitivity map.

11. A camera comprising the motion detecting component according to claim 10.

12. The camera according to claim 11, further comprising a wide-angle lens through which images are captured by one image sensor of the camera.

13. The camera according to claim 12, further comprising a plurality of image sensors and further comprising a stitching component adapted to stitch image frames from a plurality of primary images captured by the plurality of image sensors.

14. The camera according to claim 11, further comprising a plurality of image sensors and further comprising a stitching component adapted to stitch image frames from a plurality of primary images captured by the plurality of image sensors.

15. The camera according to claim 12, wherein the spatial resolution distribution component is configured to determine the spatial resolution distribution based on a lens polynomial of the wide-angle lens.

16. The camera according to claim 15, further comprising:
an optical dome, wherein the distorted image frames are produced by capturing by one image sensor through the optical dome, and wherein the spatial resolution distribution component is configured to determine the spatial distribution based on a lens polynomial of the optical dome.

17. The camera according to claim 15, wherein the areas of the motion detection sensitivity map forms an elliptical pattern radially extending from a reference position of the motion detection sensitivity map, and wherein the motion detection sensitivity level of each area increases with a radial distance from the area to the reference position.

18. The camera according to claim 14, wherein the stitching component stitches, based on a projection algorithm, the image frames from the plurality of primary images, wherein the spatial resolution distribution component determines the spatial resolution distribution based on the projection algorithm.

19. The method according to claim 1, wherein the distorted image frames are produced by capturing by one image sensor through a wide-angle lens, and wherein the spatial resolution distribution is determined based on a lens polynomial of the wide-angle lens, and wherein the method further comprises:
stitching, based on a projection algorithm, of a plurality of primary images captured by one or more image sensors to produce each distorted image frame.

20. The method according to claim 19, wherein the areas of the motion detection sensitivity map forms an elliptical pattern radially extending from a reference position of the motion detection sensitivity map, and wherein the motion detection sensitivity level of each area increases with a radial distance from the area to the reference position.

* * * * *